(12) United States Patent
St. Onge et al.

(10) Patent No.: US 7,975,182 B2
(45) Date of Patent: Jul. 5, 2011

(54) METHOD, SYSTEM AND COMPUTER PROGRAM PRODUCT FOR GENERATING TRACE DATA

(75) Inventors: Debbie A. St. Onge, Poughkeepsie, NY (US); Jane H. Bartik, Poughkeepsie, NY (US); Barry W. Krumm, Poughkeepsie, NY (US); Erwin Pfeffer, Lam (DE); Chung-Lung Kevin Shum, Wappingers Falls, NY (US)

(73) Assignee: International Business Machines Corporation, Armonk, NY (US)

( * ) Notice: Subject to any disclaimer, the term of this patent is extended or adjusted under 35 U.S.C. 154(b) by 476 days.

(21) Appl. No.: 12/036,430

(22) Filed: Feb. 25, 2008

(65) Prior Publication Data

US 2009/0216516 A1    Aug. 27, 2009

(51) Int. Cl.
G06F 11/00    (2006.01)

(52) U.S. Cl. .................................................. 714/45

(58) Field of Classification Search .............. 714/45; 703/21; 717/128
See application file for complete search history.

(56) References Cited

U.S. PATENT DOCUMENTS

| | | | |
|---|---|---|---|
| 4,680,700 A | 7/1987 | Hester et al. | |
| 5,371,689 A | 12/1994 | Tatsuma | |
| 5,450,545 A * | 9/1995 | Martin et al. | 717/109 |
| 5,615,357 A | 3/1997 | Ball et al. | |
| 5,694,587 A | 12/1997 | Webb et al. | |
| 5,848,262 A | 12/1998 | Burch | |
| 6,059,835 A | 5/2000 | Bose | |
| 6,418,521 B1 | 7/2002 | Matthews et al. | |
| 6,598,221 B1 | 7/2003 | Pegatoquet et al. | |
| 6,643,630 B1 | 11/2003 | Pegatoquet et al. | |
| 6,996,517 B1 | 2/2006 | Papaefstathiou | |
| 7,346,758 B1 * | 3/2008 | Baring-Gould et al. | 711/207 |
| 2004/0002839 A1 | 1/2004 | Ulrich | |
| 2004/0117768 A1 * | 6/2004 | Chang et al. | 717/125 |
| 2005/0076113 A1 * | 4/2005 | Klotz et al. | 709/224 |
| 2005/0175079 A1 * | 8/2005 | Gamper et al. | 375/228 |
| 2006/0069952 A1 * | 3/2006 | Peled et al. | 714/25 |
| 2006/0230391 A1 * | 10/2006 | Alexander et al. | 717/130 |
| 2007/0234306 A1 * | 10/2007 | Klinger et al. | 717/128 |
| 2007/0261031 A1 * | 11/2007 | Nandyal et al. | 717/128 |

OTHER PUBLICATIONS

"IBM® z/Architecture Principles of Operation", Publication No. SA22-7832-05, 6th Edition, Apr. 2007. 1,215 pages separated into 4 electronic attachments.

* cited by examiner

Primary Examiner — Scott T Baderman
Assistant Examiner — Yair Leibovich
(74) Attorney, Agent, or Firm — Cantor Colburn LLP; John Campbell (57) ABSTRACT

There is provided a method, system and computer program product for generating trace data related to a data processing system event. The method includes: receiving an instruction relating to the system event from a location in the system; determining a minimum number of trace segment records required to record instruction information; and creating a trace segment table including the number of trace segment records, the number of trace segment records including at least one instruction record.

16 Claims, 13 Drawing Sheets

| Record Type | Description |
|---|---|
| 00001 | Virtual Address (Dat Request) - 1200 |
| 00010 | Absolute Address (Dat Request) - 1300 |
| 00011 | ASCE (Dat Request) - 1400 |
| 00111 | RSTO (TLB2) - 1500 |
| 00110 | RTTO (TLB2) - 1600 |
| 00101 | STO (TLB2) - 1700 |
| 00100 | PTO (TLB2) - 1800 |
| 10111 | Comment Record - 2000 |
| 10000 | PASN Record - 800 |
| 11000 | Instruction fetch address record (I-TLB), System Area - 900 |
| 11001 | Destination Operand Record, System Area - 1100 |
| 11010 | Instruction Record (Itext) - 300 |
| 11011 | Source Operand Record, System Area - 1000 |
| 11100 | Instruction fetch address record (I-TLB) - 500 |
| 11101 | Destination Operand Record - 700 |
| 11110 | IA Record + TOD - 400 |
| 11111 | Source Operand Record - 600 |

METHOD, SYSTEM AND COMPUTER PROGRAM PRODUCT FOR GENERATING TRACE DATA

BACKGROUND OF THE INVENTION

This invention relates generally to computer system performance modeling, and more particularly to providing improved trace data.

Data processing systems which use virtual addressing in multiple virtual address spaces are well known. Many data processing systems include, for example, a central processing unit (CPU) and a main storage. The CPU contains the sequencing and processing facilities for instruction execution, interruption action, timing functions, initial program loading and other machine related functions. The main storage is directly addressable and provides for high-speed processing of data by the CPU. The main storage may be either physically integrated with the CPU or constructed in stand-alone units.

In general, address spaces reside in main storage wherein an address space is a consecutive sequence of integer numbers (or virtual addresses), together with the specific transformation parameters which allow each number to be associated with a byte location in storage. The sequence starts at zero and proceeds left to right.

When a virtual address is used by a CPU to access main storage, it is first converted, by means of dynamic address translation (DAT), to a real address, and then, by means of prefixing, to an absolute address. DAT uses various levels of tables as transformation parameters. Dynamic address translation (DAT) translates a virtual address of a computer system to a real address by means of translation tables. The designation (in the past, including origin and length) of a table is found for use by DAT in a control register or as specified by an access register.

Tracing assists in determining whether problems exist in the data processing system by providing an ongoing record in storage of significant events, or benchmarks. An example of a tracing system is the CMS Adjunct Tracing System (CATS), which consists of a coherent, sequential and generally contiguous set of architected instruction records which are captured while processing instructions through a data processing system. Current tracing methodologies, such as CATS, are unable to capture data of complex environments due to their simulation limitations. Current instrumentation does not collect enough details in order to drive performance models.

It would be beneficial to be able to collect a subset of critical data efficiently so as to minimize the impact to the benchmark being traced.

BRIEF SUMMARY OF THE INVENTION

An exemplary embodiment includes a method of generating trace data related to a data processing system event. The method includes: receiving an instruction relating to the system event from a location in the system; determining a minimum number of trace segment records required to record instruction information; and creating a trace segment table including the number of trace segment records, the number of trace segment records including at least one instruction record.

Another exemplary embodiment includes a computer program product for generating trace data related to a data processing system event. The computer program product includes a computer-readable storage medium for storing instructions for executing a method of: receiving an instruction relating to the system event from a location in the system; determining a minimum number of trace segment records required to record instruction information; and creating a trace segment table including the number of trace segment records, the number of trace segment records including at least one instruction record.

A further exemplary embodiment includes a system for creating trace segments related to a data processing system event. The system includes at least one translation lookaside buffer (TLB) for storing translation data, a memory for storing instruction information, and a processor in operable communication with the at least one TLB and the memory. The processor performs: receiving an instruction relating to the system event from a location in the system; determining a minimum number of trace segments required to record the instruction; and creating a trace segment table including the number of trace segments from at least one of the instruction information and the translation information, the number of trace segments including at least one instruction record.

BRIEF DESCRIPTION OF THE DRAWINGS

Referring now to the drawings wherein like elements are numbered alike in the several FIGURES.

DETAILED DESCRIPTION OF EXEMPLARY EMBODIMENTS

An exemplary embodiment of the present invention provides a system and method for generating trace data used in data processing system performance modeling. The method includes generating trace record segments, i.e., trace segments, associated with data from various parts of the system. The method also provides for expanding the trace segments into expanded traces, and for validating the trace records and the expanded trace records.

The system and method described herein provides a way to store a minimal amount of data regarding a system event, such as a data capture and/or movement, which may be expanded into a more verbose/useable format. The data provided by the trace records is minimized, thus minimizing the impact on system performance. This data may be efficiently knitted together as trace segments or expanded traces which may be used by the performance community to test the system.

Figure 1:
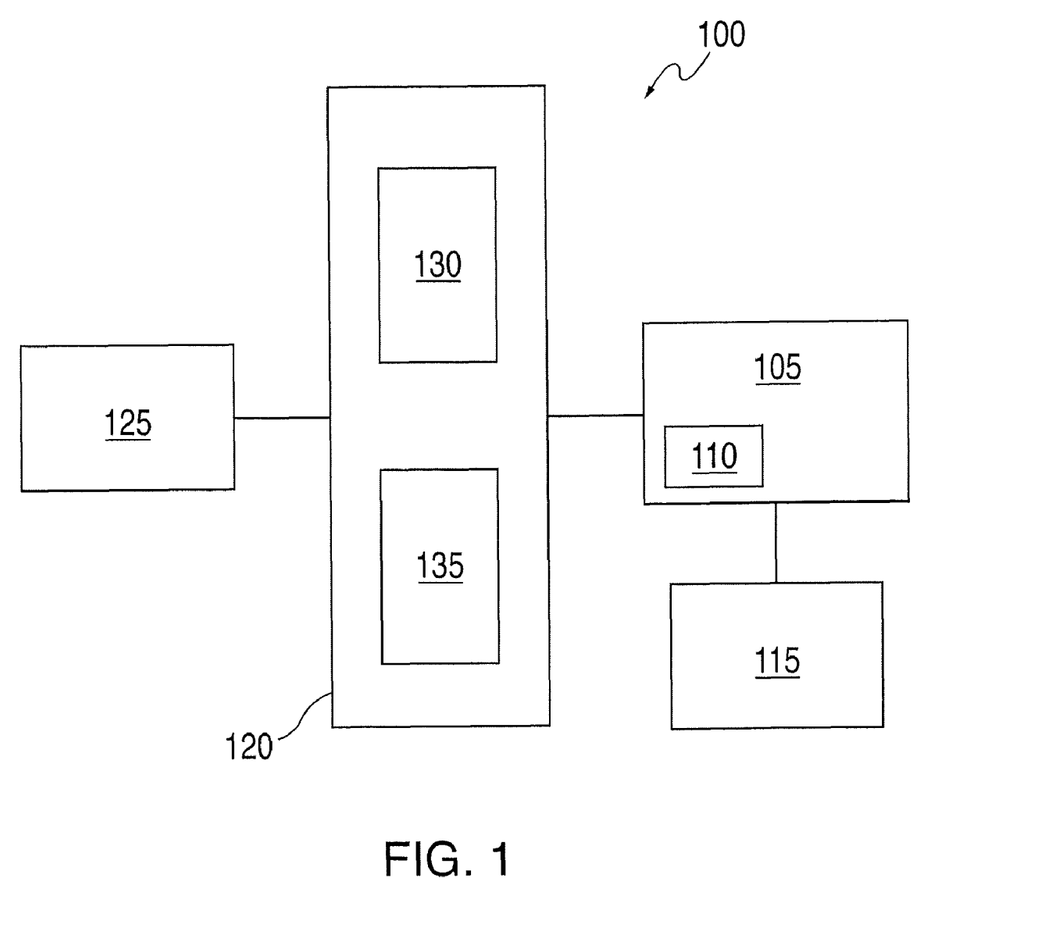
FIG. 1 is an exemplary embodiment of a system for performing methods described herein.

Referring to FIG. 1, there is provided a data processing system 100. The system 100 includes a central processor or central processing unit (CPU) 105. The CPU 105 may include any suitable components, such as an instruction fetch unit 110, and may be coupled in communication with a memory 115.

The CPU may be coupled in communication with a number of translation lookaside buffers (TLB), which are cache memories that generally hold only translation table mappings. On every reference, the TLB is used to look up a virtual page number for the reference. If there is a hit, a physical page number is used to form the address, and the corresponding reference bit is turned on. If a miss in the TLB occurs, and if the referenced page exists in memory, the translation can be loaded from the page table in the memory 115 into the TLB and the reference can be tried again. If the page is not present in the memory 115, a page fault has occurred and the CPU must be notified with an exception.

In one embodiment, the TLBs include a first level TLB 120 or "TLB1", and a second level TLB 120 or "TLB2" that supports the TLB1. In one embodiment, the TLB1 includes an instruction cache (I-cache) 130 corresponding to an instruction TLB or "ITLB" and a data cache (D-cache) 135 corresponding to a data TLB or "DTLB".

The TLBs are described herein, without limitation, as an embodiment adapted to IBM z-series architecture. This architecture uses TLB combined region-and-segment-table entries (CRSTE) connected to TLB page-table entries (PTE), where first regions, then segments and thereafter pages is the order in which address translation takes place.

The system 100 may be used in conjunction with any suitable computer architecture. In one example, the systems and methods described herein are used in conjunction with processors using IBM's z-series architecture, as described in, for example, "IBM® z/Architecture Principles of Operation," Publication No. SA22-7832-05, 6th Edition, April 2007, which is hereby incorporated herein by reference in its entirety.

The system 100 described herein is merely exemplary. The system may include any additional components as necessary to provide for processing of data. Exemplary components include, without limitation, storage, memory, input devices, output devices and the like. As these components are known to those skilled in the art, these are not depicted in any detail herein.

Referring to FIGS. 2-18, an exemplary trace segment table is provided, including a variety of record types. As used herein, "table" refers to a collection of trace segments, which may take any suitable form, such as a virtual or memory page. One or more record types may make up one or more trace record segments, and may be referred to as Translations Instructions Addresses, or "TrInA", record segments. These records may be created by different units, such as the CPU 105, and may be stored, for example, in memory 115 or other suitable location. Each record type is defined in more detail in conjunction with FIGS. 3-18 below.

Figure 2:
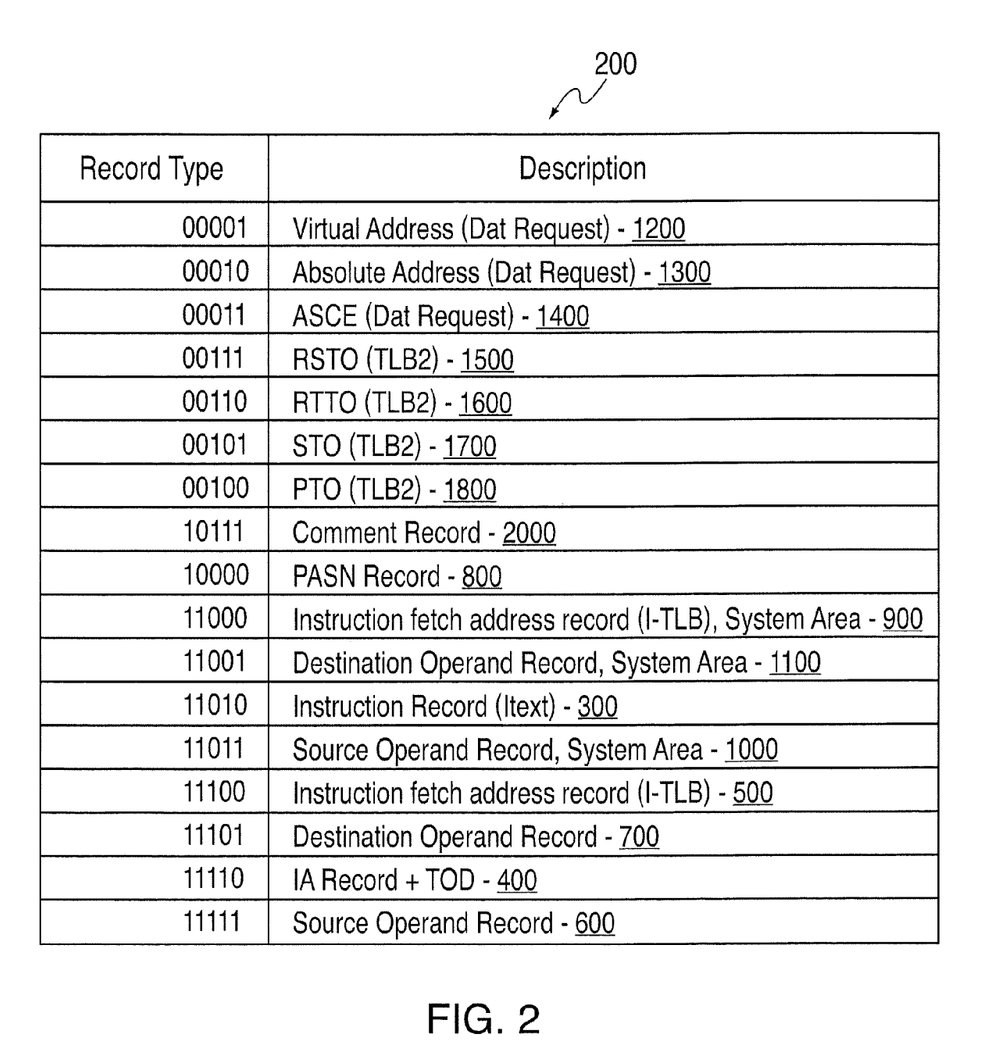
FIG. 2 is an exemplary embodiment of a trace segment table.

Referring to FIG. 2, there is provided a trace segment table 200 including a plurality of trace record segments. Each record segment provides specific information relative to a system event, for example, an instruction. In the embodiment described herein, each record segment is a 64-bit record including bits 0-63. However, this configuration is exemplary, and any suitable type or size of the record segments may be used. The trace segment table includes one or more of the following instruction record segments:

1. an instruction record 300 for each instruction (from fetched instruction);
2. an instruction Address (IA) and Time of Day (TOD) record 400 (i.e., IA+TOD) (from fetched instruction);
3. an Instruction Translation Lookaside Buffer (ITLB) record 500 (from TLB1); and
4. operand records as necessary (from fetched instruction), such as source operand record 600 and destination operand record 700. Depending on the instruction type, zero or more operand records may be generated.

The trace segment table 200 may also include, as needed:
5. a Primary Address Space Number (PASN) record 800 (from fetched instruction).

Alternatively, if the system area is accessed, the ITLB and operand records may include the following:
6. an ITLB System Area record 900 (from TLB1); and
7. operand system area records (from fetched instruction) as necessary, such as source operand (system area) record 1000 and a destination operand (system area) record 1100.

In the situations where a TLB miss occurs, various translation records may be generated. Multiple layers of translation are supported and may be encoded in these translation records. Dependent upon the types of record segments passed, and the specific bit values, the type of translation miss or hit may be determined, and where in the system the translation activity took place may also be determined, e.g. where in the PTE/CRSTE. Examples of such translation records include:

8. a virtual address record 1200 (from TLB1 and/or TLB2);
9. an absolute address record 1300 (from TLB1 and/or TLB2);
10. an address space control element (ASCE) record 1400 (from TLB1 and/or TLB2);
11. a region second table origin (RSTO) record 1500 (from TLB2);
12. a region third table origin (RTTO) record 1600 (from TLB2);
13. a segment table origin (STO) record 1700 (from TLB2); and
14. a page table origin (PTO) record 1800 (from TLB2).

In another embodiment, a comment record 2000 may also be included in the trace segment table 200. The comment record may be added during post-processing.

Figure 3:
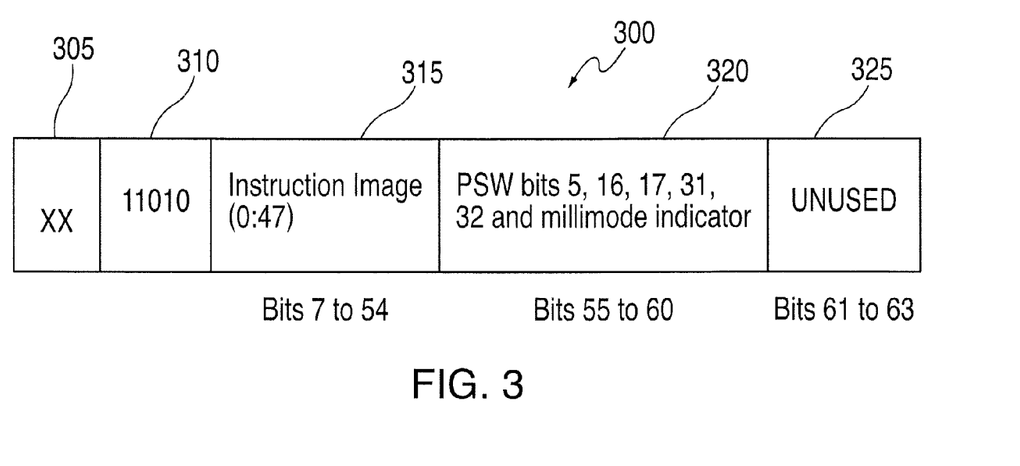
FIG. 3 depicts an example of an instruction record segment.

Referring to FIG. 3, the instruction record 300 is shown. The instruction record 300 may take any suitable form, and may be, for example, an Itext record. In situations where the instruction is a millicoded instruction, the operating code for the instruction is the millicode operating code.

In one embodiment, the instruction record 300 includes a plurality of regions 305-325. An ID region 305, corresponding to bits 0-1, identifies the central processor. A record type region 310, corresponding to bits 2-6, identifies the type of record. An instruction region 315, corresponding to bits 7-54, provides information regarding the instruction image. In one example, the instruction region 315 contains information taken from the corresponding instruction, e.g., bits 0-47 of the corresponding instruction. A PSW region 320, corresponding to bits 55-60, includes information from the current program-status word (PSW) in the central processor, as well as an indication as to whether the instruction is in millimode. In one example, The PSW region 320 includes bits 5, 16, 17, 31 and 32 of the PSW. A region 325, corresponding to bits 61-63, is unused.

Figure 4:
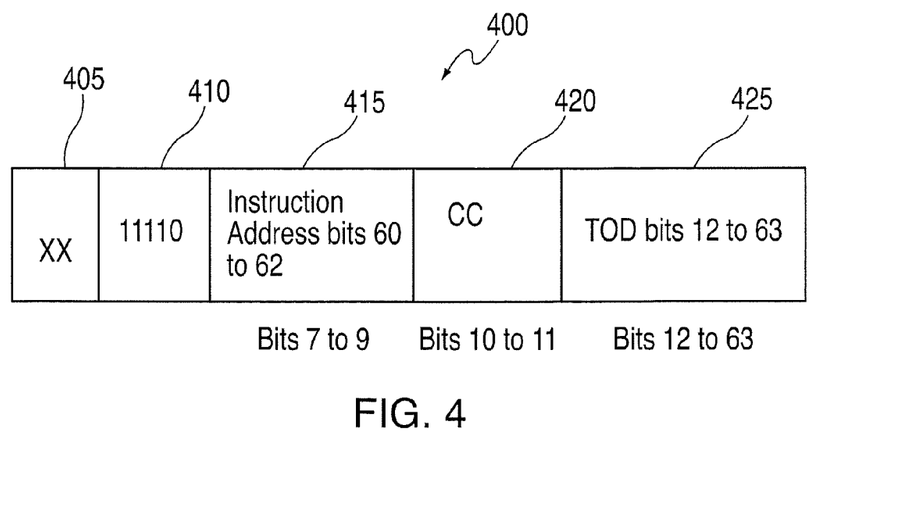
FIG. 4 depicts an example of an instruction Address (IA) and Time of Day (TOD) record segment.

Referring to FIG. 4, the instruction address and time of day (IA+TOD) record 400 is shown. In one embodiment, the IA+TOD record 400 includes a plurality of regions 405-425. An ID region 405, corresponding to bits 0-1, identifies the central processor. A record type region 410, corresponding to bits 2-6, identifies the type of record. An instruction address region 415, corresponding to bits 7-9, provides information regarding the instruction address. In one example, the instruction address region 415 contains information taken from the corresponding instruction, e.g., address bits 60-62 of the corresponding instruction. A condition code region 420, corresponding to bits 10-11, includes information regarding condition codes set in the PSW in the central processor. A TOD region 425, corresponding to bits 12-63, includes TOD clock information.

Figure 5:
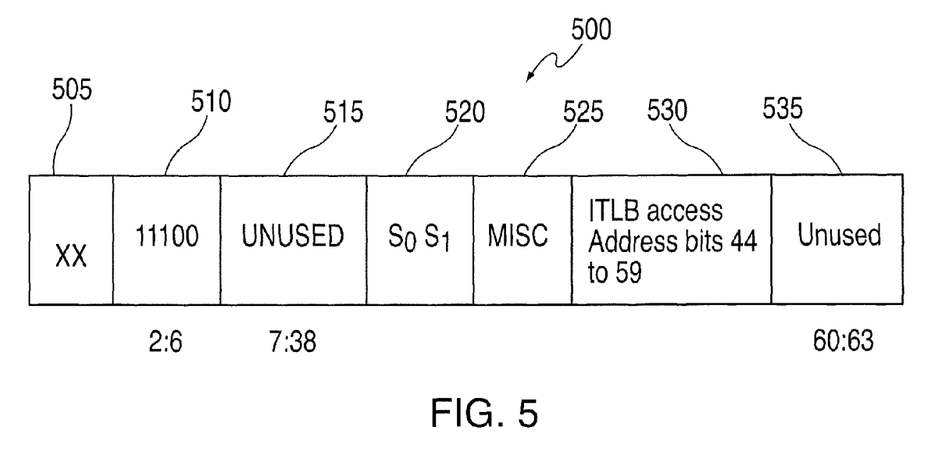
FIG. 5 depicts an example of an Instruction Translation Lookaside Buffer (ITLB) record segment.

Referring to FIG. 5, the instruction translation lookaside buffer (ITLB) record 500 is shown. The ITLB record 500 is provided for each unique ITLB access (including purges). In one embodiment, a single instruction (e.g., when crossing a page boundary) may result in two ITLB accesses. In one embodiment, the ITLB record 500 includes a plurality of regions 505-535.

An ID region 505, corresponding to bits 0-1, identifies the central processor. A record type region 510, corresponding to bits 2-6, identifies the type of record. A region 515, corresponding to bits 7-38, is unused. A translation region 520 provides bits referred to as $S_0$ and $S_1$, which are used to associate the TLB2 records for a specific page reference to corresponding records in the ITLB 500. A miscellaneous region 525, corresponding to bits 41-43, identifies the TLB operation. An address region 530, corresponding to bits 44-59, provides ITLB access address information. A region 535, corresponding to bits 60-63, is unused.

Figure 6:
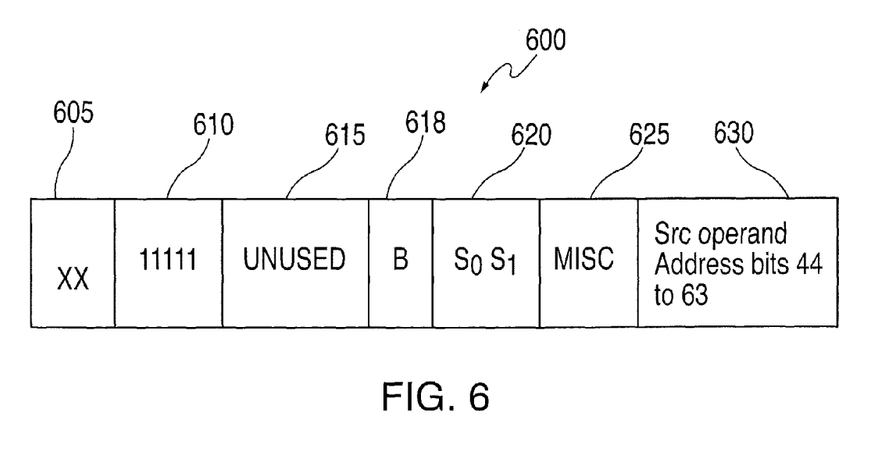
FIG. 6 depicts an example of a source operand record segment.

Referring to FIG. 6, the source operand record 600 is shown. In one embodiment, the source operand record 600 includes a plurality of regions 605-630. An ID region 605, corresponding to bits 0-1, identifies the central processor. A record type region 610, corresponding to bits 2-6, identifies the type of record. A region 615, corresponding to bits 7-37, is unused. For branch instructions, A branch ("B") region 618, corresponding to bit 38, provides an indicator as to whether a branch has been taken. A translation region 620 provides bits $S_0$ and $S_1$, corresponding to bits 39-40, to associate the TLB2 records for a specific page reference to corresponding records in a DTLB. A miscellaneous region 625, corresponding to bits 41-43, identifies the DTLB operation. An address region 630, corresponding to bits 44-63, provides the source operand address information.

Figure 7:
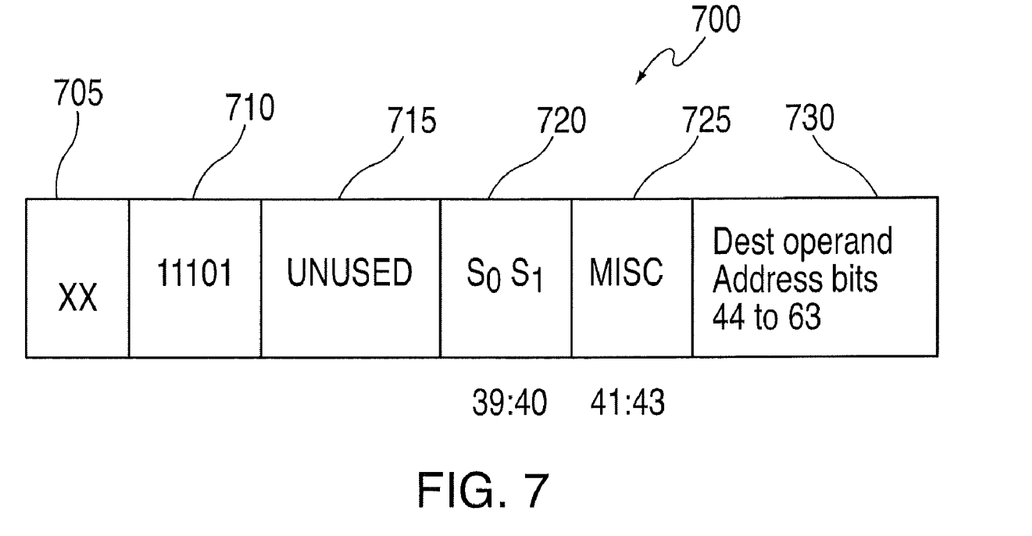
FIG. 7 depicts an example of a destination operand record segment.

Referring to FIG. 7, the destination operand record 700 is shown. In one embodiment, the destination operand record 700 includes a plurality of regions 705-730. An ID region 705, corresponding to bits 0-1, identifies the central processor. A record type region 710, corresponding to bits 2-6, identifies the type of record. A region 715, corresponding to bits 7-38, is unused. A translation region 720 provides bits $S_0$ and $S_1$, corresponding to bits 39-40, to associate the TLB2 records for a specific page reference to corresponding records in the DTLB. A miscellaneous region 725, corresponding to bits 41-43, identifies the DTLB operation. An address region 730, corresponding to bits 44-63, provides the destination operand address information.

As discussed above, the translation regions 520, 620 and 720 associate the TLB2 records for a specific instruction page reference to corresponding entries in the ITLB and/or the DTLB. On the first accesses or references to the instruction page, the bits $S_0$ and $S_1$ serve to tie the TLB2 records with the ITLB and/or DTLB records for a specific instruction. Depending on the operands or other inputs provided for an instruction, an instruction page may end up with entries in both the ITLB and the DTLB. On subsequent accesses or references, bits $S_0$ and $S_1$ may be used to tie translation data for an instruction to the references. This allows for the creation of DAT and translation timing records in the trace segment and any subsequent sub-traces or traces generated from the trace segments.

In one embodiment, the $S_0$ and $S_1$ bits identify which entry in the TLB (either ITLB or DTLB, depending on the record), correspond to a current reference. The values of these bits, in the form of $S_0 S_1$, may be defined as follows:
- 00—illegal;
- 01—entry hit is for entry 0;
- 10—entry hit is for entry 1; and
- 11—illegal (except in the instance of a purge, in which case this value indicates that both entries have bee purged).

Figure 8:
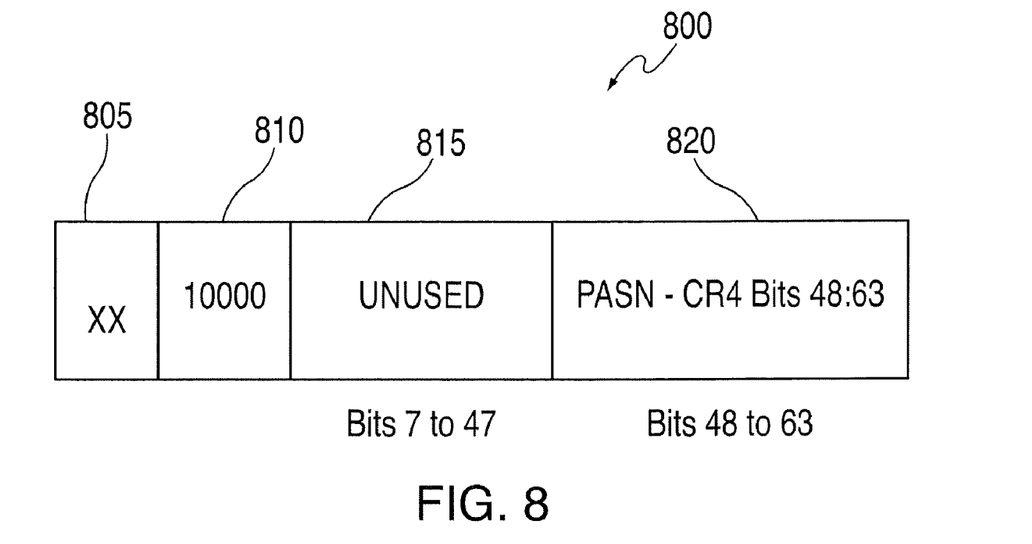
FIG. 8 depicts an example of a Primary Address Space Number (PASN) record segment.

Referring to FIG. 8, the a Primary Address Space Number (PASN) record 800 is shown. In one embodiment, the PASN record 800 includes a plurality of regions 805-820. An ID region 805, corresponding to bits 0-1, identifies the central processor. A record type region 810, corresponding to bits 2-6, identifies the type of record, A region 815, corresponding to bits 7-47, is unused. A PASN region 820, corresponding to bits 48-63, identifies the PASN and control-register (CR) assignment (e.g., CR4).

Figure 9:
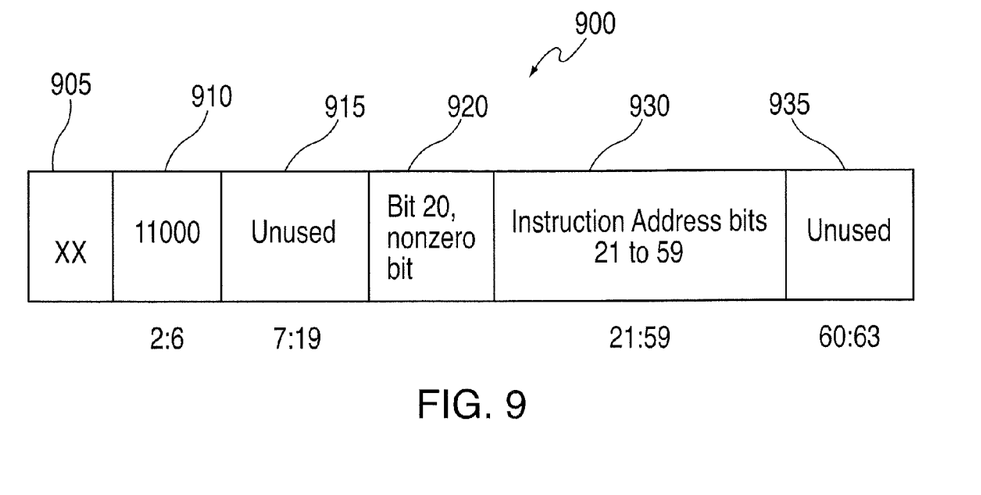
FIG. 9 depicts another example of an ITLB record segment.

Referring to FIG. 9, the ITLB System Area record 900 is shown. In one embodiment, the ITLB System Area record 900 includes a plurality of regions 905-930. An ID region 905, corresponding to bits 0-1, identifies the central processor. A record type region 910, corresponding to bits 2-6, identifies the type of record. A region 915, corresponding to bits 7-19, is unused. A nonzero bit area 920 includes a nonzero value corresponding to bit 20. An address region 930, corresponding to bits 21-59, provides the instruction address information. A region 935, corresponding to bits 60-63, is unused.

Figure 10:
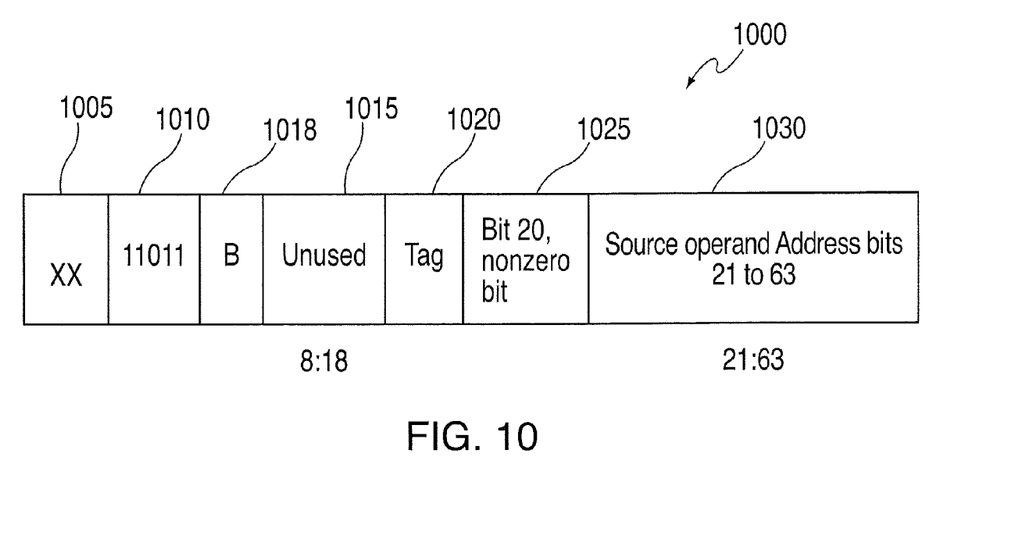
FIG. 10 depicts another example of a source operand record segment.

Referring to FIG. 10, the source operand (system area) record 1000 is shown. In one embodiment, the source operand (system area) record 1000 includes a plurality of regions 1005-1030. An ID region 1005, corresponding to bits 0-1, identifies the central processor. A record type region 1010, corresponding to bits 2-6, identifies the type of record. For branch instructions, A branch ("B") region 1018, corresponding to bit 7, provides an indicator as to whether a branch has been taken. A region 1015, corresponding to bits 8-18, is unused. A tag region 1020, corresponding to bit 19, is defined as "any absolute", where a value of one indicates an absolute address of a load/store unit (LSU) any non-system area, and a value of one indicates a LSU of the system area. A nonzero bit area 1025 includes a nonzero value corresponding to bit 20. An address region 1030, corresponding to bits 21-63, provides the source operand address information.

Figure 11:
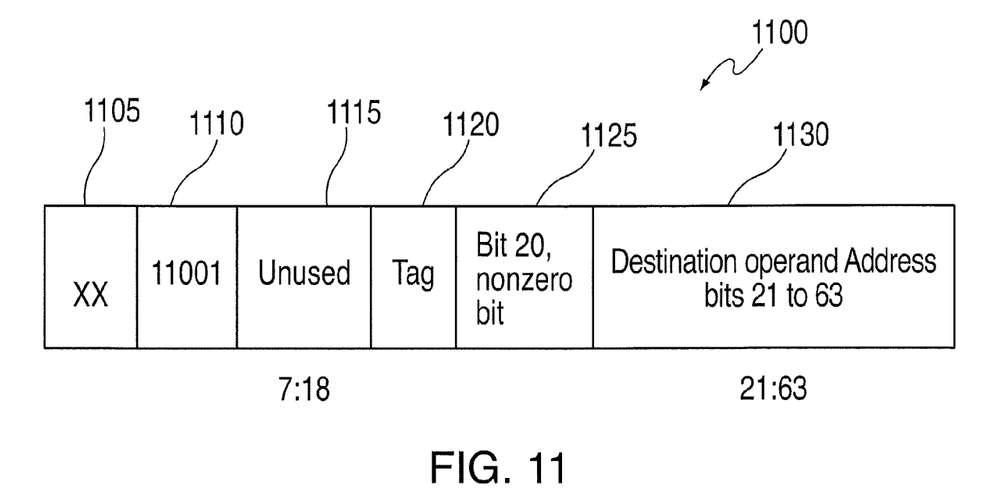
FIG. 11 depicts another example of a destination operand record segment.

Referring to FIG. 11, the destination operand (system area) record 1100 is shown. In one embodiment, the destination operand (system area) record 1100 includes a plurality of regions 1105-1130. An ID region 1105, corresponding to bits 0-1, identifies the central processor. A record type region

1110, corresponding to bits 2-6, identifies the type of record. A region 1115, corresponding to bits 7-18, is unused. A tag region 1120, corresponding to bit 19, is defined as "any absolute", where a value of one indicates an absolute address of a load/store unit (LSU) any non-system area, and a value of one indicates a LSU of the system area. A nonzero bit area 1125 includes a nonzero value corresponding to bit 20. An address region 1130, corresponding to bits 21-63, provides the destination operand address information.

Figure 12:
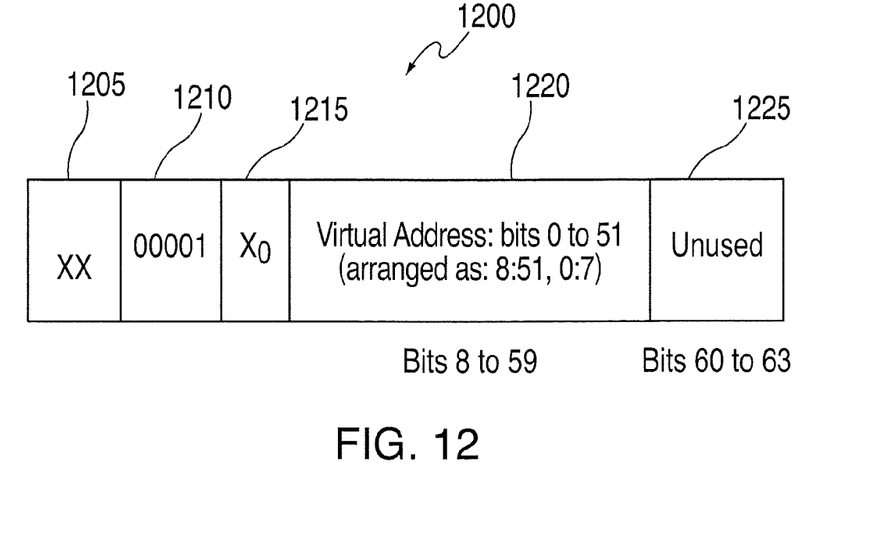
FIG. 12 depicts an example of a virtual address record segment.

Referring to FIG. 12, the virtual address record 1200 is shown. In one embodiment, the virtual address record 1200 includes a plurality of regions 1205-1225. An ID region 1205, corresponding to bits 0-1, identifies the central processor. A record type region 1210, corresponding to bits 2-6, identifies the type of record. A TLB1 region 1215, corresponding to bit 7, includes a value $X_0$ to indicate the type of TLB1, i.e., whether TLB1 is an ITLB or a DTLB. For example, an $X_0$ value of one may indicate that the TLB1 is an ITLB (i.e., in the I-cache), and an $X_0$ value of zero may indicate that the TLB1 is a DTLB (i.e., in the D-cache). An address region 1220, corresponding to bits 8-59, provides the virtual address (e.g., bits 0-51 of the virtual address). A region 1225, corresponding to bits 60-63, is unused.

Figure 13:
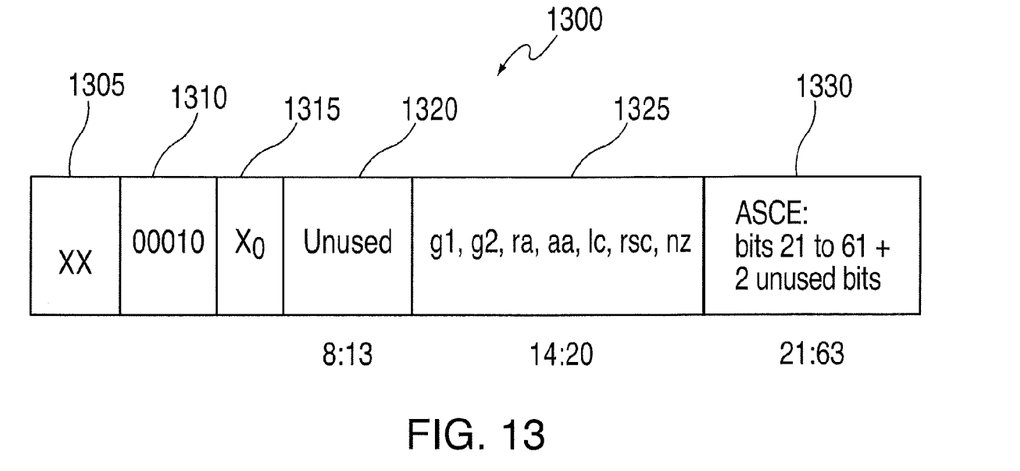
FIG. 13 depicts an example of an absolute address record segment.

Referring to FIG. 13, the address space control element (ASCE) record 1300 is shown. In one embodiment, the ASCE record 1300 includes a plurality of regions 1305-1330. An ID region 1305, corresponding to bits 0-1, identifies the central processor. A record type region 1310, corresponding to bits 2-6, identifies the type of record. A TLB1 region 1315, corresponding to bit 7, includes the value $X_0$ to indicate the type of TLB1, i.e., whether TLB1 is an ITLB or a DTLB. A region 1320, corresponding to bits 8-13, is unused. A region 1325, corresponding to bits 14-20, provides the following information:

Bit 14—g1: SIE (Start Interpretive Execution) guest 1 mode;

Bit 15—g2: SIE guest 2 mode;

Bit 16—ra: real address (which may be the invert of bit 5 of the PSW, and may be set when DAT is zero);

Bit 17—aa: absolute address;

Bit 18—ic: ignore common segment/private space (which may be bit 18 of the ASCE);

Bit 19—rsc: real space control (which may be bit 58 of the ASCE); and

Bit 20—nz: non-zero bit, which may be set if any of the ASCE bits 0-20 are non-zero.

An ASCE region 1330, corresponding to bits 21-61, includes ASCE information. Bits 62-63 of the ASCE region 1330 may be unused.

Figure 14:
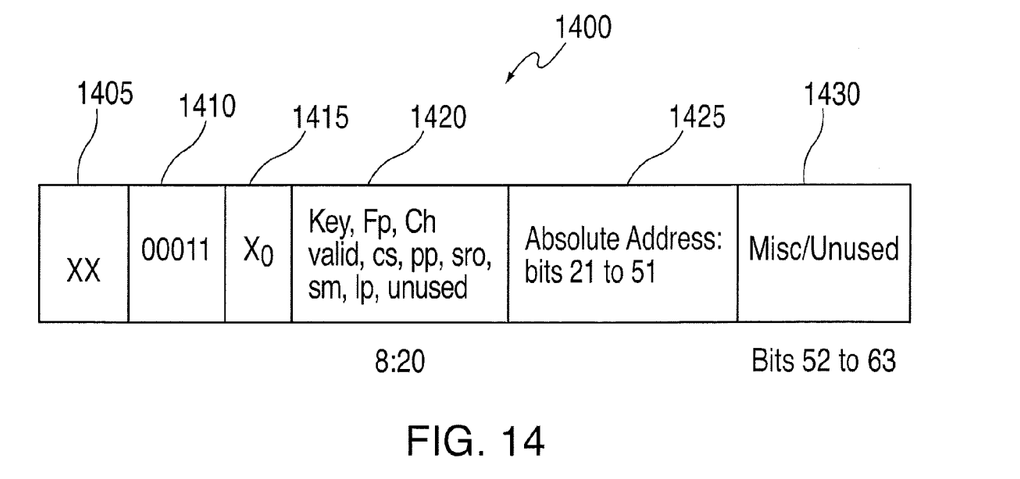
FIG. 14 depicts an example of an address space control element (ASCE) record segment.

Referring to FIG. 14, the absolute address record 1400 is shown. In one embodiment, the absolute address record 1400 includes a plurality of regions 1405-1430. An ID region 1405, corresponding to bits 0-1, identifies the central processor. A record type region 1410, corresponding to bits 2-6, identifies the type of record. A TLB1 region 1415, corresponding to bit 7, includes the value $X_0$ to indicate the type of TLB1, i.e., whether TLB1 is an ITLB or a DTLB. A region 1420, corresponding to bits 8-20, provides the following information:

Bits 8-11—storage key access control bits;

Bit 12—fp: fetch protection, which may be taken from an "F" bit in a storage key;

Bit 13—ch: change bit, which may be taken from a "C" bit in the storage key;

Bit 14—valid: indicate whether the storage key is valid;

Bit 15—cs: common segment bit (which may be bit 59 of the STE);

Bit 16—pp: page protection bit (which may be bit 54 of the PTE); and

Bit 17—sro: shared memory read-only bit;

Bit 18—sm: shared-memory bit; and

Bit 19—lp: large page bit.

An absolute address region 1425, corresponding to bits 21-51, includes absolute address information. A region 1430, corresponding to bits 52-63, may be unused.

In one embodiment, if the page ends up in both the ITLB and the DTLB, then the first reference to the page will have the complete set of translation records. The second reference to the page will include only the virtual address record 1200, the absolute address record 1400, and the ASCE record 1300. In this embodiment, the only difference between the address and ASCE records of the first reference and the address and ASCE records of the second reference will be in the $X_0$ bit (i.e., address referring to the I-cache or the D-cache).

Figure 15:
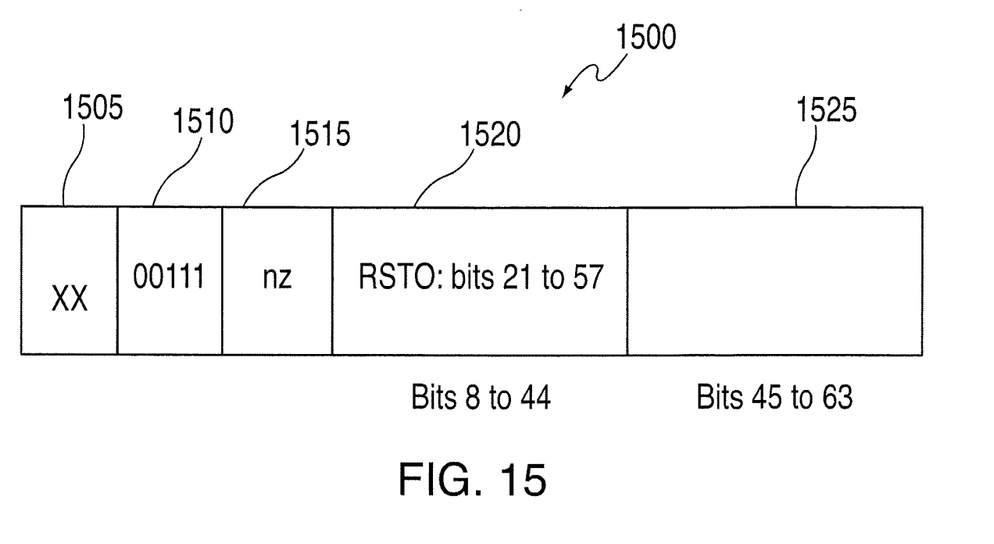
FIG. 15 depicts an example of a region second table origin (RSTO) record segment.

Referring to FIG. 15, the region second table origin (RSTO) record 1500 is shown. In one embodiment, the RSTO record 1500 includes a plurality of regions 1505-1525. An ID region 1505, corresponding to bits 0-1, identifies the central processor. A record type region 1510, corresponding to bits 2-6, identifies the type of record. An nz region 1515, corresponding to bit 7, includes a non-zero bit. An RSTO region 1520, corresponding to bits 8-44, includes RSTO information. A region 1525, corresponding to bits 45-63, may be unused.

Figure 16:
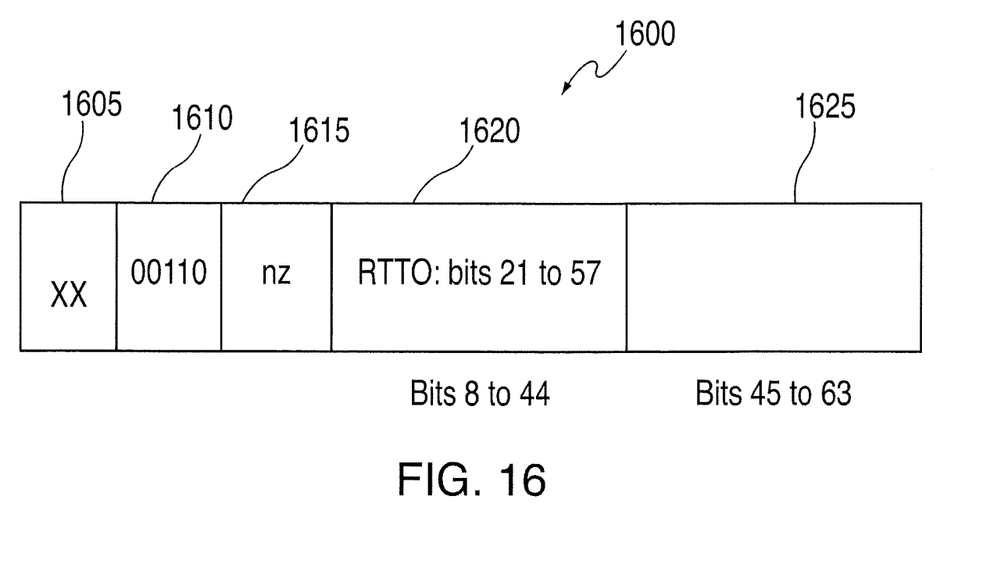
FIG. 16 depicts an example of a region third table origin (RTTO) record segment.

Referring to FIG. 16, the region third table origin (RTTO) record 1600 is shown. In one embodiment, the RTTO record 1600 includes a plurality of regions 1605-1625. An ID region 1605, corresponding to bits 0-1, identifies the central processor. A record type region 1610, corresponding to bits 2-6, identifies the type of record. An nz region 1615, corresponding to bit 7, includes a non-zero bit. An RTTO region 1620, corresponding to bits 8-44, includes RTTO information. A region 1625, corresponding to bits 45-63, may be unused.

Figure 17:
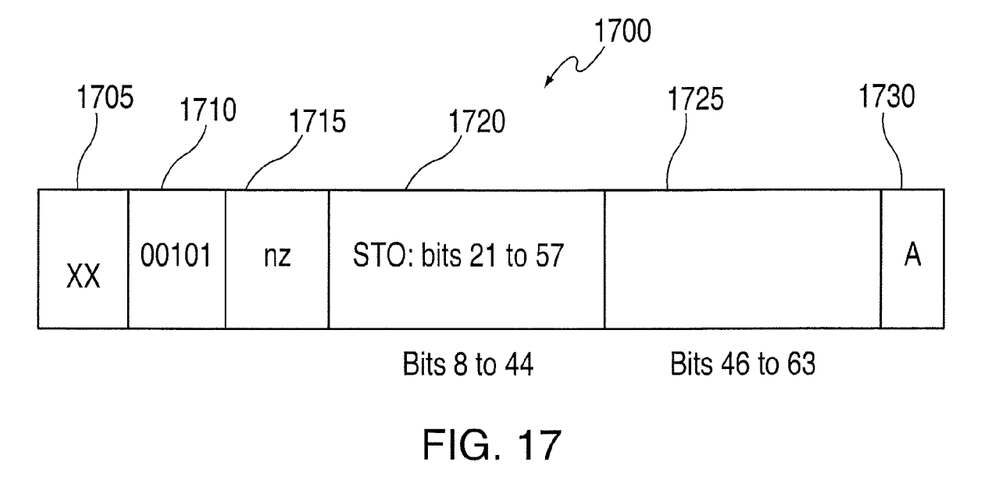
FIG. 17 depicts an example of a segment table origin (STO) record segment.

Referring to FIG. 17, the segment table origin (STO) record 1700 is shown. In one embodiment, the STO record 1700 includes a plurality of regions 1705-1730. An ID region 1705, corresponding to bits 0-1, identifies the central processor. A record type region 1710, corresponding to bits 2-6, identifies the type of record. An nz region 1715, corresponding to bit 7, includes a non-zero bit. An STO region 1720, corresponding to bits 8-44, includes STO information. A region 1725, corresponding to bits 45-63, may be unused. An "A" region 1730 may be included to indicate a type of operating system architecture, such as the IBM ESA390 or ESAME systems.

Figure 18:
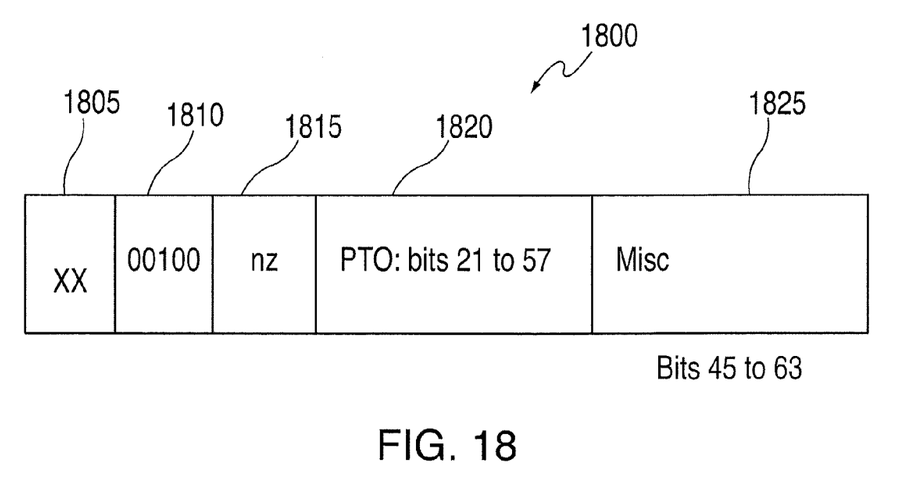
FIG. 18 depicts an example of a page table origin (PTO) record segment.

Referring to FIG. 18, the page table origin (PTO) record 1800 is shown. In one embodiment, the PTO record 1800 includes a plurality of regions 1805-1825. An ID region 1805, corresponding to bits 0-1, identifies the central processor. A record type region 1810, corresponding to bits 2-6, identifies the type of record. An nz region 1815, corresponding to bit 7, includes a non-zero bit. A PTO region 1820, corresponding to bits 8-44, includes PTO information. A miscellaneous region 1825, corresponding to bits 45-63, includes information such as CRSTE entry, zone and PTE settings.

There is provided a method for generating trace segments, generating traces from the trace segments and validating generation results. The method includes one or more of the following stages. Note that the method need not include every stage described herein, and is not limited to the order in which the stages are presented. The method is described herein in conjunction with the system 100, although the method may be performed in conjunction with any type, number and configuration of processors or processing systems.

In a first stage, a minimum number of trace segments is determined. For example, if a TLB miss occurs, translation information may be loaded into the TLB1, for example, and translation records such as the virtual address, absolute address and ASCE records may be generated as trace segments. In another example, operand information from an instruction may be used to determine whether operand record segments should be generated.

In a second stage, various trace segments as described above may be generated. Information for the trace segments may be taken from any needed storage areas, and may utilize various pages such as the instruction, PSW, ASCE, etc.

Figure 19A:
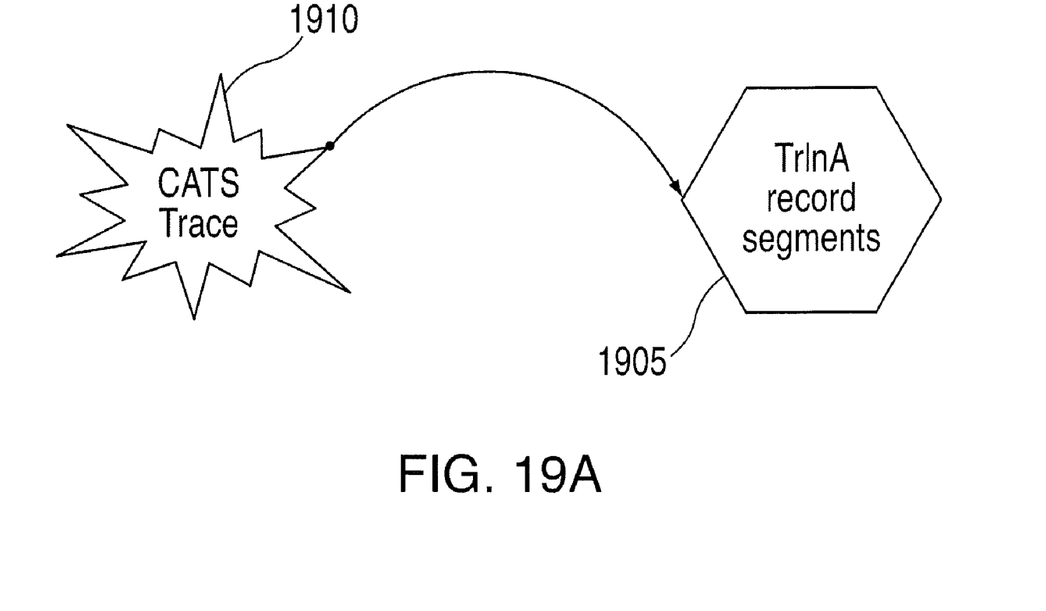
FIGS. 19A-D depict a method for generating trace data as described herein.

Referring to FIG. 19A, in one embodiment, trace record segments 1905 may be generated by taking information from a trace 1910. The trace 1910 may be a pre-calculated trace, or may be generated during the method described herein. In one embodiment, the trace is generated via the CMS Adjunct Tracing System, i.e., is a CATS trace, although any suitable systems or processes may be employed to generate the trace.

In one embodiment, a C (or other programming language) program is created to generate the trace record segments, which will allow users to determine how much data to be put out in various environments. The program may also be used to prepare for processing the actual record segments.

Figure 19B:
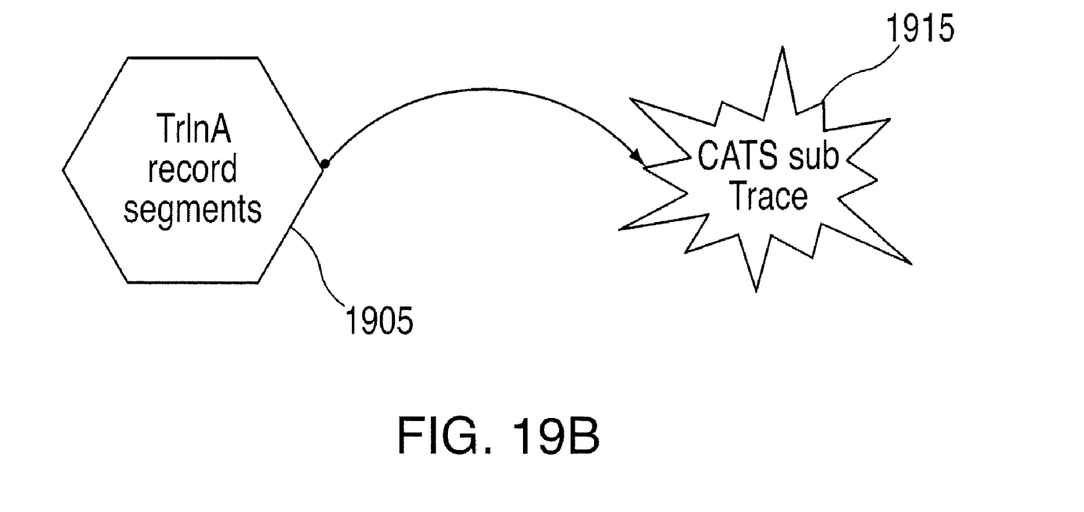

Referring to FIG. 19B, in a third stage, record segments 1905 are processed to generate a sub-trace 1915. Sub-traces 1915 are of the same format as the trace 1910, but have pieces of data missing relative to the trace 1910. In one embodiment, the sub-trace 1915 is a CATS sub-trace.

In one embodiment, a C (or other programming language) program is written to process the record segments 1905 and generate the CATS sub-trace 1915. The same C program may be later used to process the record segments 1905 generated by a system hardware.

Figure 19C:
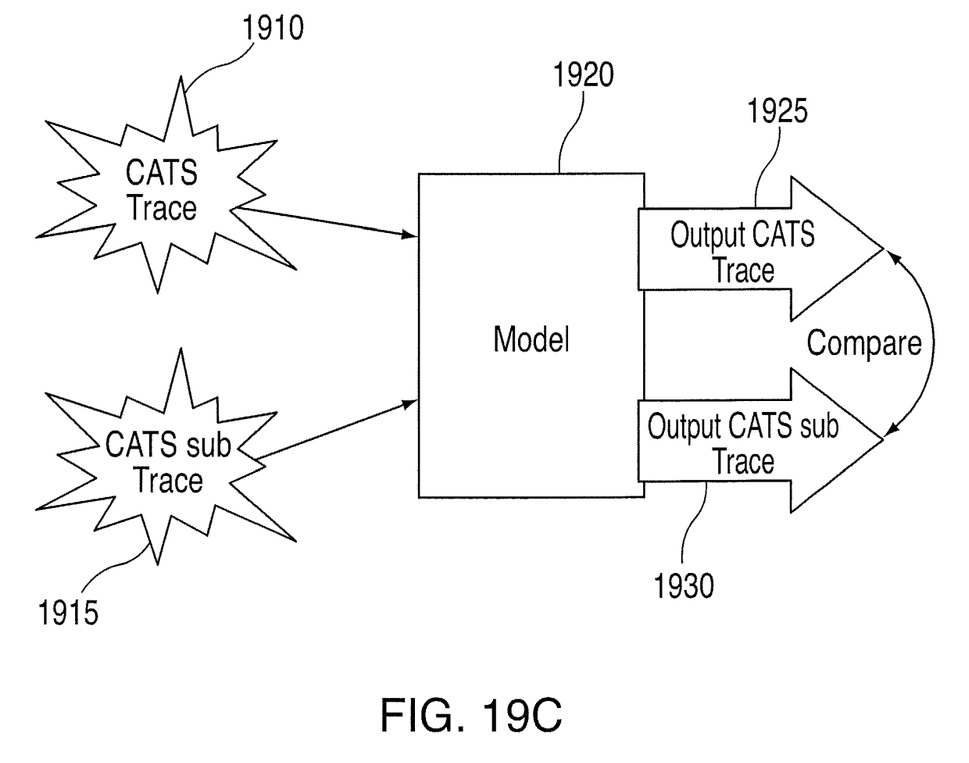

Referring to FIG. 19C, in a fourth stage, the sub-trace generation process may be validated. In one embodiment, the sub-trace 1915 and the trace 1910 are inputted into a model 1920, such as a performance model that simulate various portions of the system 100, including the processor, a cache, one or more TLBs, and others. A trace output 1925 and a sub-trace output 1930 are generated. The sub-trace output 1930 may be compared to the trace output 1925 to determine whether the sub-trace 1915 was properly generated.

Figure 19D:
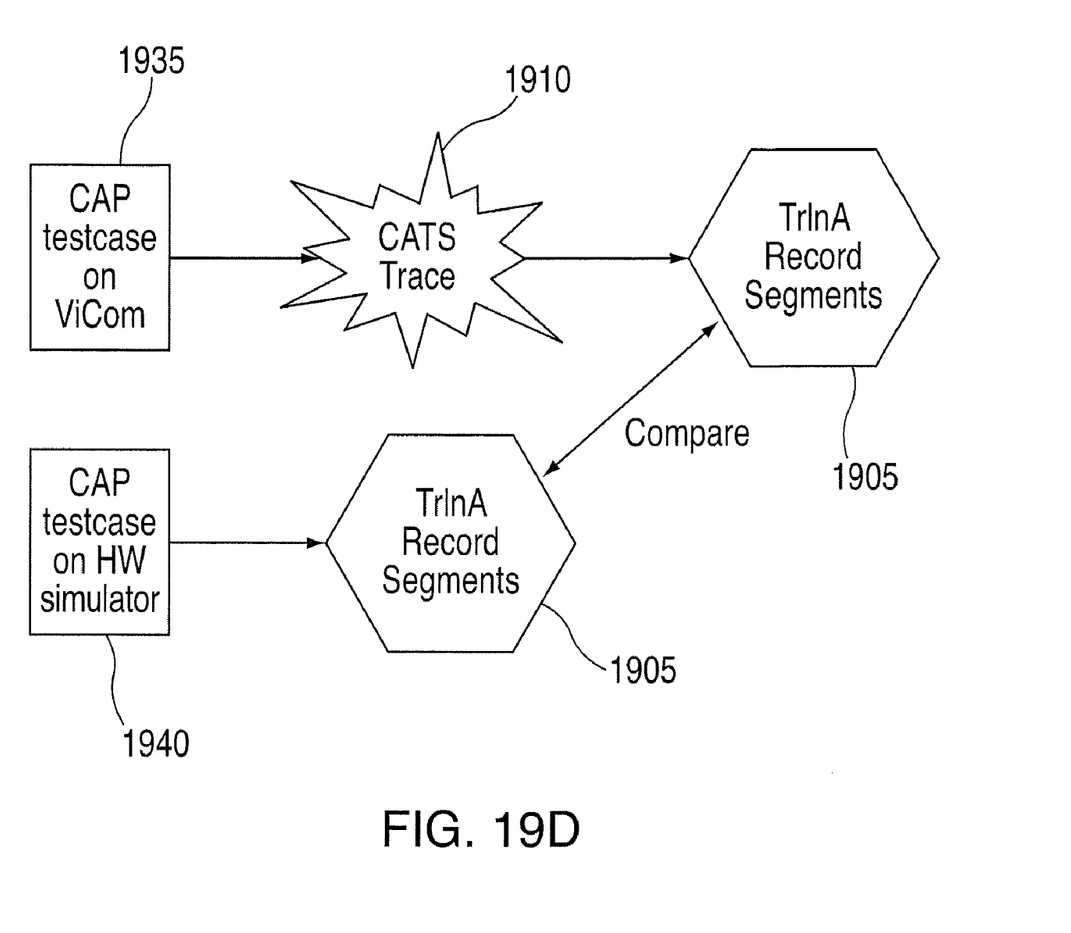

Referring to FIG. 19D, in a fifth stage, the trace segment generation process may be validated by generating the trace 1910 and the trace segments 1905 via a controlled testing suite, such as a Complete Automation Package (CAP) testcase suite. For example, the trace 1910 may be generated via a CAP testcase 1935 on ViCom, and the trace segments 1905 may be generated from the trace 1910. Also, the trace segments 1905 may be independently generated from a hardware simulator 1940, and compared to the trace segments 1905 that are generated from the trace 1910 to validate the generation process.

The method depicted herein is just an example. There may be many variations to the stages (or operations) described therein without departing from the spirit of the invention. For instance, the stages may be performed in a differing order, or steps may be added, deleted or modified. All of these variations are considered a part of the claimed invention.

Technical effects and benefits include providing trace data for performance testing that requires only the minimum amount of data necessary, and thus the minimum impact on the system. Concurrently, the method also retrieves as much information as is necessary to provide accurate address and instruction data, including translation data as necessary.

Thus, the system and method provide all information needed to fully record system events, with a minimum impact on system performance.

The capabilities of the present invention can be implemented in software, firmware, hardware or some combination thereof.

As described above, the embodiments of the invention may be embodied in the form of computer-implemented processes and apparatuses for practicing those processes. Embodiments of the invention may also be embodied in the form of computer program code containing instructions embodied in tangible media, such as floppy diskettes, CD-ROMs, hard drives, or any other computer-readable storage medium, wherein, when the computer program code is loaded into and executed by a computer, the computer becomes an apparatus for practicing the invention. The present invention can also be embodied in the form of computer program code, for example, whether stored in a storage medium, loaded into and/or executed by a computer, or transmitted over some transmission medium, such as over electrical wiring or cabling, through fiber optics, or via electromagnetic radiation, wherein, when the computer program code is loaded into and executed by a computer, the computer becomes an apparatus for practicing the invention. When implemented on a general-purpose microprocessor, the computer program code segments configure the microprocessor to create specific logic circuits.

While the invention has been described with reference to exemplary embodiments, it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment disclosed as the best mode contemplated for carrying out this invention, but that the invention will include all embodiments falling within the scope of the appended claims. Moreover, the use of the terms first, second, etc. do not denote any order or importance, but rather the terms first, second, etc. are used to distinguish one element from another.

The invention claimed is:

1. A method of generating trace data related to a data processing system event, the method comprising: receiving an instruction relating to the system event from a location in the system; determining a minimum number of trace segment records required to record instruction information; creating a trace segment table including the number of trace segment records, the number of trace segment records including at least one instruction record; generating a sub-trace from the trace segment records, the sub-trace having a fewer number of data records than a trace generated for the instruction; and validating the trace segment table by generating the trace and a first instance of the trace segments via a controlled testing suite, generating a second instance of the trace segments from the trace, and comparing the first instance and the second instance.

2. The method of claim 1, wherein determining the minimum number of trace segment records comprises at least one of: determining whether a translation lookaside buffer (TLB) miss has occurred, and determining a number of operands in the instruction.

3. The method of claim 1, wherein the trace segment records are selected from at least one of: instruction records and translation records.

4. The method of claim 1, further comprising creating the trace segment table from the trace.

5. The method of claim 4, wherein the sub-trace has an identical format as the trace.

6. The method of claim 1, wherein the trace is generated by a CMS Adjunct Tracing System.

7. The method of claim 5, further comprising validating the sub-trace by inputting the sub-trace into a data processing system model and receiving a sub-trace output, inputting the trace into the model and receiving a trace output, and comparing the sub-trace output and the trace output.

8. A computer program product for generating trace data related to a data processing system event, the computer program product comprising: a computer-readable storage medium for storing instructions for executing a method of: receiving an instruction relating to the system event from a location in the system; determining a minimum number of trace segment records required to record instruction information; creating a trace segment table including the number of trace segment records, the number of trace segment records including at least one instruction record; and generating a sub-trace from the trace segment records, the sub-trace having a fewer number of data records than a trace generated for the instruction; and validating the trace segment table by generating the trace and a first instance of the trace segments via a controlled testing suite, generating a second instance of the trace segments from the trace, and comparing the first instance and the second instance.

9. The computer program product of claim 8, wherein determining the minimum number of trace segment records comprises at least one of: determining whether a translation lookaside buffer (TLB) miss has occurred, and determining a number of operands in the instruction.

10. The computer program product of claim 8, wherein the trace segment records are selected from at least one of: instruction records and translation records.

11. The computer program product of claim 8, further comprising creating the trace segment table from the trace.

12. The computer program product of claim 11, wherein the sub-trace has an identical format as the trace.

13. The computer program product of claim 12, further comprising validating the sub-trace by inputting the sub-trace into a data processing system model and receiving a sub-trace output, inputting the trace into the model and receiving a trace output, and comparing the sub-trace output and the trace output.

14. A system for creating trace segments related to a data processing system event, the system comprising:
    at least one translation lookaside buffer (TLB) for storing translation data;
    a memory for storing instruction information; and
    a processor in operable communication with the at least one TLB and the memory, the processor performing:
    receiving an instruction relating to the system event from a location in the system;
    determining a minimum number of trace segments required to record the instruction;
    creating a trace segment table including the number of trace segments from at least one of the instruction information and the translation information, the number of trace segments including at least one instruction record;
    generating a sub-trace from the trace segment records, the sub-trace having a fewer number of data records than a trace generated for the instruction; and
    validating the trace segment table by generating the trace and a first instance of the trace segments via a controlled testing suite, generating a second instance of the trace segments from the trace, and comparing the first instance and the second instance.

15. The system of claim 14, further comprising another TLB in communication with the processor.

16. The system of claim 15, wherein the trace segment records are selected from at least one of: instruction records, translation records generated in the at least one TLB and translation records generated in the another TLB.

* * * * *